United States Patent [19]

Fujihara et al.

[11] Patent Number: 4,729,596
[45] Date of Patent: Mar. 8, 1988

[54] VEHICLE ROOF STRUCTURE HAVING LEFT AND RIGHT REMOVABLE ROOF LIDS

[75] Inventors: Ryoji Fujihara, Tokyo; Kazuaki Furuse, Atsugi; Satoshi Ishizuka; Kouichi Yagami, both of Zama; Tsutomu Iwasaki, Yokohama, all of Japan

[73] Assignee: Nissan Motor Co., Ltd., Yokohama, Japan

[21] Appl. No.: 35,420

[22] Filed: Apr. 7, 1987

[30] Foreign Application Priority Data

Apr. 8, 1986 [JP] Japan .................................. 61-80481
Apr. 24, 1986 [JP] Japan .................................. 61-93261

[51] Int. Cl.$^4$ ............................. B60J 7/11; B60J 7/19
[52] U.S. Cl. .................................... 296/218; 296/220; 296/224; 16/380
[58] Field of Search ...................... 296/218, 220, 224; 16/271, 272, 254, 355, 380

[56] References Cited

U.S. PATENT DOCUMENTS 4,428,155  1/1984  Kwan .............................. 296/218 X
4,626,026  12/1986  Hasegawa .......................... 296/218

FOREIGN PATENT DOCUMENTS 59-186735  10/1984  Japan .

OTHER PUBLICATIONS

"Jidosha Kogaku Zensho", published by Sankaido, vol. 13, p. 158.

Primary Examiner—Dennis H. Pedder
Attorney, Agent, or Firm—Schwartz, Jeffery, Schwaab, Mack, Blumenthal & Evans

[57] ABSTRACT

An open-top type vehicle roof structure is composed of a frame structure having left and right roof openings separated by a longitudinal center beam, and left and right removable roof lids closing the left and right openings and concealing the center beam under the roof surface. Front and rear latch plates are fixed to the underside of each latch plate near the inner end. The center beam is provided with front and rear receiving members each of which is fixed on the top of center beam, and formed with left and right latch holes for receiving the latch plates of the left and right lids. Each of the latch plates may be formed with an upward flange for preventing an undesired release of the lid by engaging with one of downward flanges of one receiving member, or may be formed with a rectangular corner cut for receiving the projecting end of the opposite latch plate.

13 Claims, 20 Drawing Figures

VEHICLE ROOF STRUCTURE HAVING LEFT AND RIGHT REMOVABLE ROOF LIDS

CROSS REFERENCE TO RELATED APPLICATION

A U.S. patent application Ser. No. 035,320, filed Apr. 7, 1987 based on a prior Japanese application No. 61-81662, relates to subject matter similar to that of the present application.

BACKGROUND OF THE INVENTION

The present invention relates to a fastening means for securing left and right removable roof lids of an open-top type vehicle roof structure.

One conventional example of such roof structures is shown in FIGS. 16 and 17. This roof structure belongs to a type called T-bar roof (for example, in "Jidosha Kogaku Zensho", published by Sankaido, vol. 13, page 158.) In a roof 302 of a vehicle body 301 shown in FIG. 16, an exterior roof surface is formed by upper surfaces of a longitudinal center beam 303, and left and right removable glass lids 305 fitted in left and right roof openings 304. Each lid 305 is removably secured to the vehicle body by a lock device 311 provided on the outboard side of each lid 305, and at least one hooked latch plate 310 fixed to the inboard end of each lid 305, as shown in FIG. 17. The opposite latch plates 310 of the left and right lids 305 are inserted, respectively, in concavities 309 of left and right concave members 308 fitted in left and right opening 307 formed in an outer panel 306 of the center beam 303, as shown in FIG. 17. FIG. 17 further shows a roof inner panel 312, and retainers 313 attached to peripheries of the lids 305.

The center beam 303 of this roof structure is always exposed to view, so that the upper surface of the center beam must be finished in the same manner as the remaining part of the roof surface.

Another conventional example is shown in FIGS. 18-20. A roof structure of this example is similar to what is disclosed in Japanese patent provisional publication No. 59-186735. A vehicle roof frame structure 401 shown in FIG. 18 has a longitudinal center beam 402 separating left and right roof openings 403. Front and rear receiving members 404 each having left and right latch holes 405 are fixed to the top of the center beam 402 by screws 406. Front and rear latch plates 408 are fixed to the underside of each of left and right roof lids 407 by screws 409, and inserted, respectively, in the left or right latch holes 405 of the front and rear receiving members 404 in the closed state, as shown in FIG. 20. Each lid 407 is locked by lock rods 410 which can be projected into lock holes 411 formed in the frame structure and retracted by manual operation. Each of the roof openings 403 is fringed with a weatherstrip 421 for abutting against the underside of one of the lids 407. In the closed state, the inner ends of the left and right lids 407 abut, literally or nearly, on each other above the receiving members 404. Therefore, the center beam 402 of this example is concealed under the roof surface in the closed state.

SUMMARY OF THE INVENTION

It is an object of the present invention to provide a vehicle roof structure capable of securing left and right removable roof lids more safely.

According to the present invention, a roof structure of a vehicle comprises a frame structure, left and right removable roof lids, and fastening means.

The frame structure has a front portion, a rear portion, and a center beam extending along a longitudinal axis of the vehicle and connecting the front and rear portions. The frame structure further has left and right roof openings formed between the front and rear portions, and separated by the center beam.

The left and right roof lids can close the left and right roof openings, respectively, to form a closed roof surface, and conceal the center beam under the closed roof surface when the left and right lids are placed in respective left and right closed positions.

The fastening means is for securing the left and right lids in the left and right closed positions to the frame structure. The fastening means comprises left and right latch means, and receiving means. The left and right latch means are fixed, respectively, to undersides of the left and right lids. The receiving means is fixedly mounted on an upper surface of the center beam, and formed with left and right latch holes for receiving the left and right latch means, respectively, when the lids are placed in the closed positions.

In some embodiments of the present invention, each of the latch holes is bounded on an upper side by a downward flange, and each of the latch means is formed with an upward flange which is inserted in one of the latch holes when the lids are placed in the closed positions. In some embodiments, each of the left and right latch means comprises a first latch plate having a raised portion fixed to the underside of one of the lids, and a depressed portion which projects from the raised portion to a projected end, and which is L-shaped and formed with a hollow corner formed by the angle of the L-shaped figure of the depressed portion so that the hollow corner of one of the latch plates of the left and right lids receives the projected end of the other of the latch plates when the lids are placed in the closed positions.

DETAILED DESCRIPTION OF THE INVENTION

Figure 1:
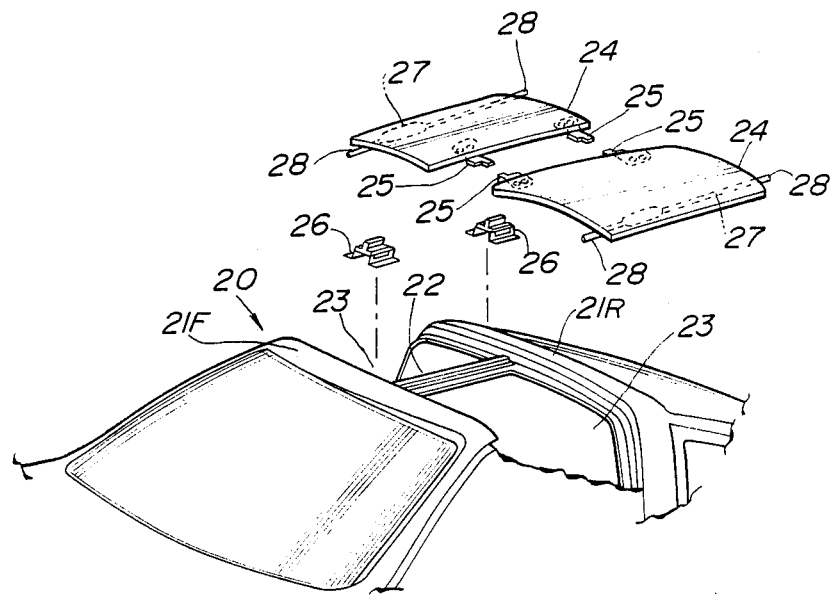
FIG. 1 is a perspective view of a roof structure for showing a first embodiment of the present invention.

A first embodiment of the present invention is shown in FIGS. 1–8. An open-top type roof structure of the first embodiment has a frame structure 20 which is a part of a vehicle body. As shown in FIG. 1, the frame structure 20 has a front portion 21F, a rear portion 21R and a longitudinal center beam 22 extending along the longitudinal axis of the vehicle in such a manner as to bisect the roof into left and right halves, and connecting the front and rear portions 21F and 21R. Thus, the frame structure 20 has left and right roof openings 23 which are separated by the center beam 22, and bounded between the front and rear portions 21F and 21R. The center beam 22 is placed at a level lower than upper surfaces of the front and rear portions 21F and 21R.

Figure 2:
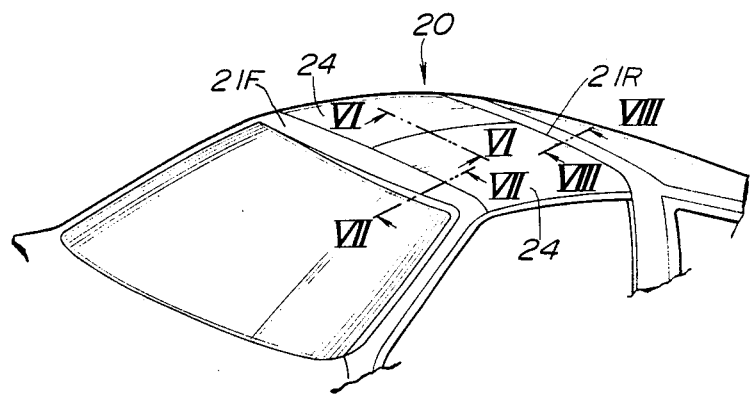
FIG. 2 is a perspective view of the roof structure of FIG. 1 with left and right roof lids in closed positions.

The left and right roof openings 23 are closed up when left and right roof lids 24 are placed in respective closed positions, in which the left and right lids 24 are fitted in the left and right openings 23, respectively, as shown in FIG. 2. In the closed positions, inner end of the left and right lids 24 substantially abut on each other along a line immediately above the center beam 22, and a continuous exterior roof surface is formed by the left and right lids 24 and the front and rear portions 21F and 21R of the frame structure 20. The center beam 22 is concealed under the roof surface formed by the left and right lids 24.

The roof structure further has fastening means for securing the left and right lids 24 to the frame structure 20. The fastening means includes the following constituent members. Front and rear receiving members 26 are fixed to a top of the center beam 22. Each of the receiving members 26 projects upwardly from the center beam 22, and has left and right latch holes 31. The front receiving member 26 is positioned near the front portion 21F, and the rear receiving member 26 is near the rear portion 21R. Front and rear latch plates 25, and a lock device 27 are fixed to an underside of each lid 24. Each lid 24 is placed in its closed position by inserting the front and rear latch plates 25 into the left or right latch holes 31 of the front and rear receiving members 26, respectively. Each of the latch plates 25 has a first end fixed to the underside of the lid 24 near the inner end of the lid 24, and a free second end. When each lid 24 is placed in its closed position, the front and rear latch plates 25 extend from their respective first ends, substantially along the lateral axis of the vehicle toward the center beam 22, to their respective second ends received in the latch holes of the front and rear receiving members 26. The lock device 27 of each lid 24 is positioned near the outer end of the lid 24, and has front and rear lock rods 28 for locking and unlocking the lid 24. When each lid 24 is locked in its closed position, the front and rear lock rods 28 are projected toward the front and rear of the vehicle, respectively, and engaged with front and rear lock holes formed in the front and rear portions 21F and 21R, respectively. Each lid 24 can be unlocked by retracting the front and rear lock rods 28.

Figure 3:
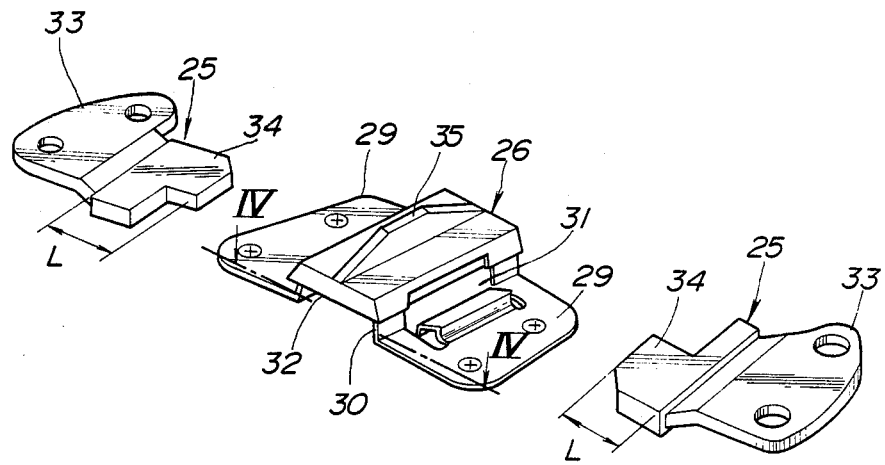
FIG. 3 is a perspective view of a set of a receiving member, and left and right latch plates, used in the roof structure of FIG. 1.

As shown in FIG. 3, each receiving member 26 has left and right flat mounting portions 29, and a central portion 30 lying between the left and right portions 29. The central portion 30 of each receiving member 26 has left and right side wall extending upwardly, respectively, from the left and right mounting portions 29, and a substantially flat top wall extending between the left and right side walls. The left and right side walls are substantially vertical, and face toward the left and right sides of the vehicle, respectively. The left latch hole 31 is formed in the left side wall, and the right latch hole 31 is in the right side wall, in each receiving member 26. The top wall of the central portion of each receiving member 26 is covered with a molding 32 of resin. Each of the latch plates 25 has a raised portion 33 which is fixed to the underside of one of the lids 24 by bolts, and a depressed portion 34 covered with a molding of resin. When the lids 24 are placed in the closed positions, depressed portion 34 of each latch plate 25 is inserted in one of the latch holes 31.

Figure 4:
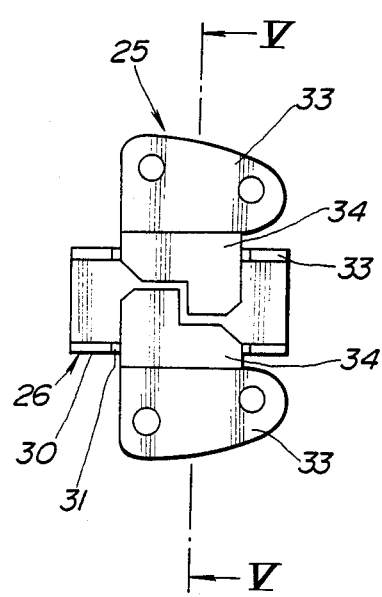
FIG. 4 is a sectional view taken on a line IV—IV of FIG. 3, for showing the left and right latch plates in the receiving member in the closed state of the left and right lids.

In each latch plate 25 of this embodiment, the depressed portion 34 is L-shaped, and has a projecting portion projecting from the raised portion 33 and having a length L as shown in FIG. 3, and rectangular hollow corner formed by the angle of the L-shaped figure. In each pair of the opposite latch plates 25 of the left and right lids 25 to be inserted in the same receiving member 26, the depressed portion of one latch plate 25 has the L-shaped figure reverse to that of the other latch plate 25 so that the hollow corner is situated behind the projecting portion in one latch plate 25 while the projecting portion is situated behind the hollow corner in the other latch plate 25. When both lids 24 are placed in the closed positions, the projecting portion of each latch plate 25 is snugly received in the hollow corner of the opposite latch plate 25 in each of the front and rear receiving members 26, as shown in FIG. 4. In this way, each latch plate 25 is deeply inserted to or beyond the center line of the receiving member 26, and securely installed in one of the receiving members 26 together with the opposite latch plate 25 without mutual interference. With the long and deeply inserted latch plates 25, the left and right lids 24 are secured to the frame structure 20 very reliably.

Each of the front and rear receiving members 26 has an upright projection 35 projecting upwardly from the top of the receiving member 26 and extending along the longitudinal axis of the vehicle. In this embodiment, the upright projection 35 of each receiving member 26 is formed in the molding 32, as shown in FIG. 5.

Figure 5:
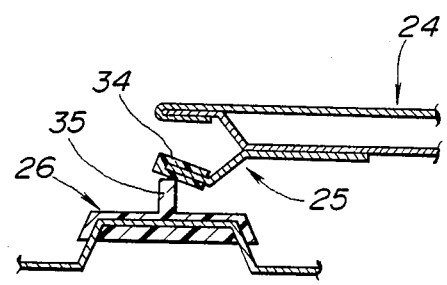
FIG. 5 is a sectional view taken on a line V—V of FIG. 4, for showing the latch plate in an improper position.

When the left or right lid 24 is placed incorrectly in its closed position, the front and rear latch plates 25 are stranded on the upright projections 35 of the front and rear receiving members 25, as shown in FIG. 5. Therefore, the lid 24 is raised above the correct closed position, so that the improper setting of the lid 24 becomes obvious.

Figure 6:
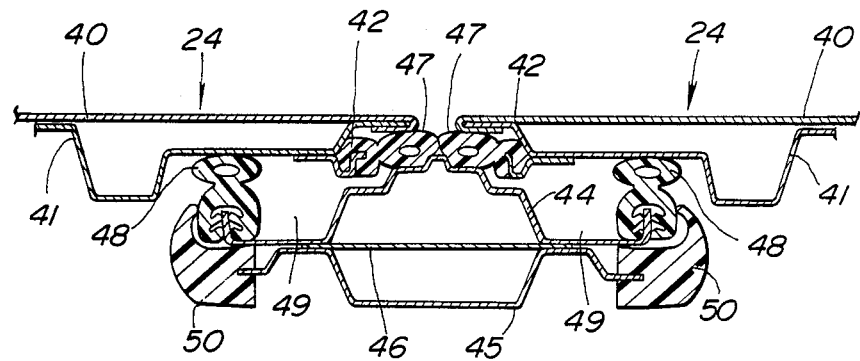
FIG. 6 is a sectional view taken on a line VI—VI of FIG. 2.
Figure 7:
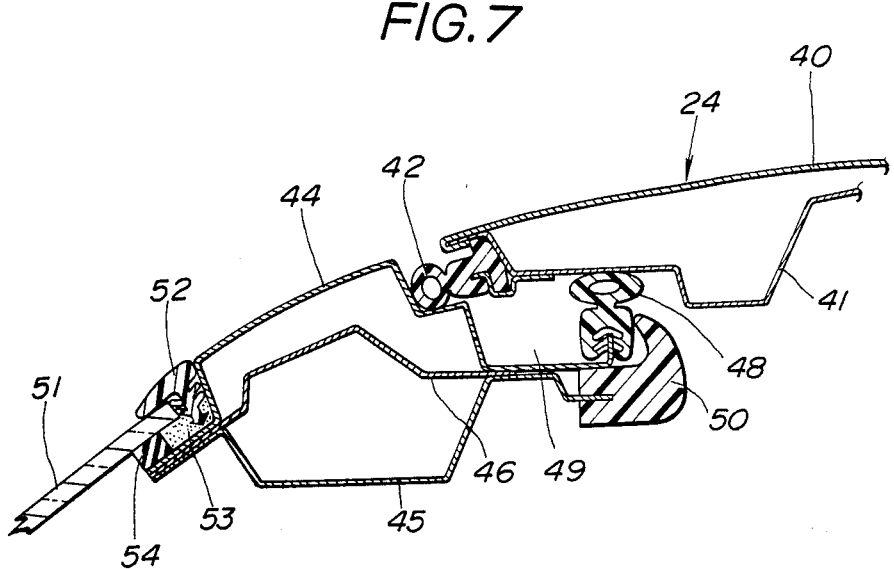
FIG. 7 is a sectional view taken on a line VII—VII of FIG. 2.
Figure 8:
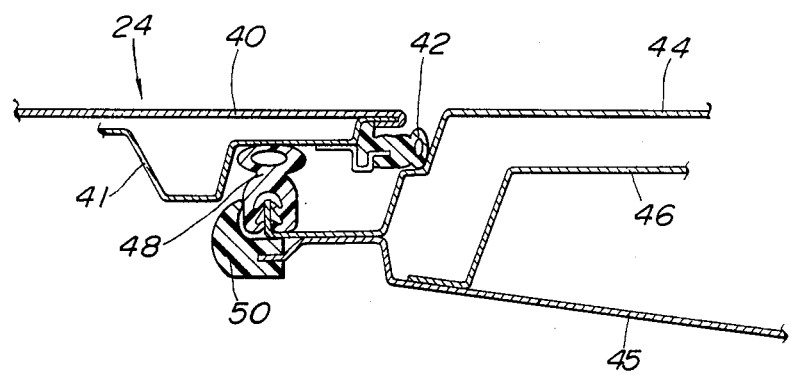
FIG. 8 is a sectional view taken on a line VIII—VIII of FIG. 2.

As shown in FIGS. 6-8, each of the left and right roof lids 24 is composed of an outer panel 40 and an inner panel 41. At least one weatherstrip 42 is attached to the periphery of each lid 24. Each of the center beam 22, and the front and rear portions of the frame structure 20 is composed of an outer panel 44, an inner panel 45 and a reinforcing panel 46. The center beam 22 is provided with weatherstrips 47 which extend along the longitudinal axis of the vehicle and about on the weatherstrips 42 of the left and right lids 24.

Each of the left and right roof openings 23 is fringed with at least one weatherstrip 48 mounted on upward flanges of the outer panels 44 of the frame structure 20 for abutting on the underside of the lid 24, and at least one drip channel 49 formed in the outer panels 44 for directing rainwater off. Projecting edges of the inner panels 45 of the frame structure 20 are covered with decorative welts 50. As shown in FIG. 7, the vehicle body further includes a front window glass (windshield glass) 51, a molding 52 covering a gap between the front window glass 51 and the outer panel 44, a layer of adhesive 53 for fastening the front window glass 52 to the vehicle body, and a dam of rubber 54.

Figure 9:
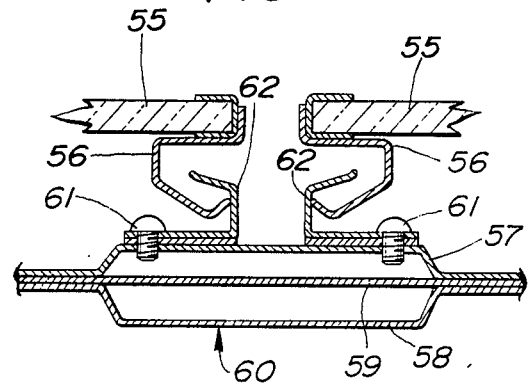
FIG. 9 is a sectional view of a main portion of a roof structure for showing a second embodiment of the present invention.

According to the present invention, the center beam is concealed under the roof surface when the lids are placed in the closed positions. Therefore, the roof structure of the present invention can improve the appearance of the roof surface, and curtail the finishing operations of the center beam. A second embodiment of the present invention is shown in FIG. 9. A roof structure of the second embodiment is basically identical to the structure of the first embodiment, but different in the following points. Each of left and right roof lids 55 of the second embodiment is made of glass. Each of latch plates 56 of the second embodiment is shaped like a hook, and fixed to the inner end of one of the lids 55. At least one pair of left and right hook-shaped receiving members 62 are fixed, by screw fasteners 61, to a center beam 60 which is composed of an outer panel 57, an inner panel 58 and a reinforcing panel 59, and concealed under the roof surface. The lids 55 are placed in the closed positions by inserting the left and right latch plates 56 of the left and right lids 55, respectively, in the concavities of the left and right receiving members 62, as shown in FIG. 9. In the second embodiment, each receiving member is simplified in design.

Figure 10:
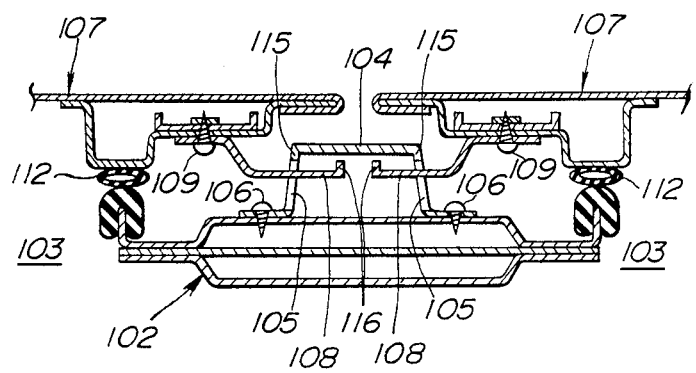
FIG. 10 is a sectional view of a main portion of a roof structure for showing a third embodiment of the present invention.
Figure 11:
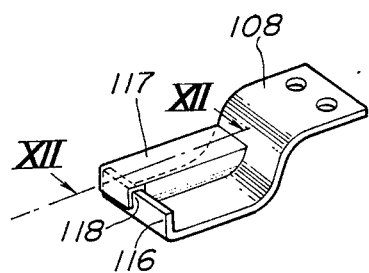
FIG. 11 is a perspective view of a latch plate used in the roof structure of FIG. 10.

A third embodiment of the present invention is shown in FIGS. 10-13. A roof structure of the third embodiment has a frame structure substantially identical to that of the first embodiment. Like the first embodiment, front and rear receiving members 104 each having left and right latch holes 105 are fixedly mounted on a longitudinal center beam 102, and front and rear latch plates 108 are fixed to the underside of each of left and right roof lids 107 near the inner end, as shown in FIG. 10.

Figure 12:
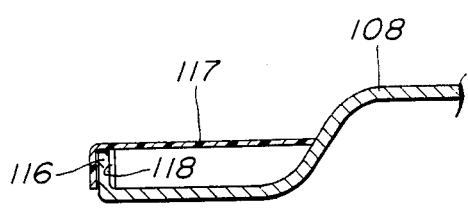
FIG. 12 is a sectional view of the latch plate, taken on a line XII—XII of FIG. 11.
Figure 13:
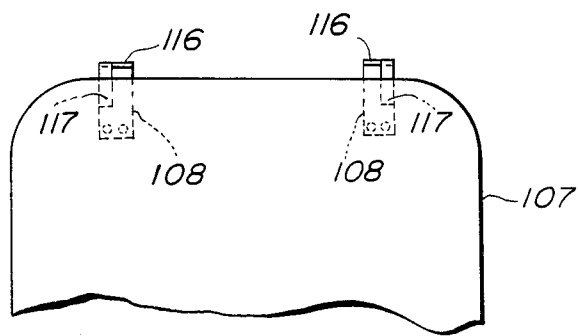
FIG. 13 is a schematic plan view of the roof lid used in the roof structure of FIG. 10, for showing the positions of guide covers.

However, each of the latch plates 108 of the third embodiment has an upward flange 116 formed at the projecting end of the latch plate 108, and each receiving members 104 has left and right downward flanges 115 forming upper borders of the left and right latch holes 105, respectively. Each of the upward and downward flanges 116 and 115 extends substantially along the longitudinal axis of the vehicle when the lids 107 are placed in the closed positions. In each latch plate 108, a front or rear half of the upward flange 116 is covered by a guide cover 117 of resin. The guide cover 117 of each latch plate 108 has a top wall having a substantially flat upper surface. One end of each guide cover 117 is formed with a cut 118. Each guide cover 117 is fixed to the latch plate 108 by inserting the upward flange 116 in the cut 118, and using adhesive bonding, for example. Each latch plate 108 has a raised portion fixed to the underside of one of the lids 107, and a depressed portion which is depressed between the upward flange 116 and the raised portion and which has a substantially flat bottom in the illustrated example. The top wall of the guide cover 117 extends from the top end of the upward flange to the raised portion substantially in parallel to the bottom of the depressed portion, and covers a half of the depressed portion. Each guide cover 117 has a boxlike cross sectional shape, so that a hollow space is formed between the top wall of the guide cover 117 and the bottom of the depressed portion of the latch plate 108, as shown in FIG. 12. The top wall of each guide cover 117 is substantially horizontal when the lids 107 are placed in the closed position, and the vehicle is on a level road. In the pair of the front and rear latch plates 108 of each lid 107, the guide cover 117 of one latch plate 108 is positioned over the front half of the depressed portion, and the guide cover 117 of the other latch plate 108 is positioned over the rear half of the depressed portion. In the third embodiment, as shown in FIG. 13, the front latch plate 108 of each lid 107 has the guide cover 117 covering the front half of the depressed portion, and the rear latch plate 108 has the cover 117 covering the rear half of the depressed portion. The guide covers 117 of each lid 107 facilitate the insertion and extraction of the latch plates 108 into and from the receiving members 104 when the lid 107 is put in the closed position, and removed. Especially when the latch plates 108 are extracted from the latch holes 105, the guide covers 117 prevent the engagement between the upward flanges 116 and the downward flanges 115 by allowing the downward flanges 115 to slide relatively on the upper surfaces of the guide covers 117.

When an excessive load is applied upwardly from the passenger compartment to one lid 107 placed in its closed position, the lid 107 is bent to bulge outwardly, and accordingly the latch plates 108 are extracted in an upwardly sloping direction. In this case, the guide covers 117 are pressed against the downward flanges 115, and easily deformed elastically. Therefore, the downward flanges 115 of the receiving members 104 prevent the extraction of the latch plates 108 by engaging with the upward flanges 116 of the latch plates 108. Thus, the upward and downward flanges 116 and 115 of the third embodiment can improve the safety by preventing undesired release of the lids 107. In the third embodiment, it is not required to reinforce the latch plates, the lids, or the receiving members by increasing the thickness of the latch plates or the panels of the lids, or by increasing the size of the fastening means such as the latch plates and the receiving members. Accordingly, the roof structure of the third embodiment incurs neither increase in the manufacturing cost nor increase in the weight of the vehicle.

Figure 14:
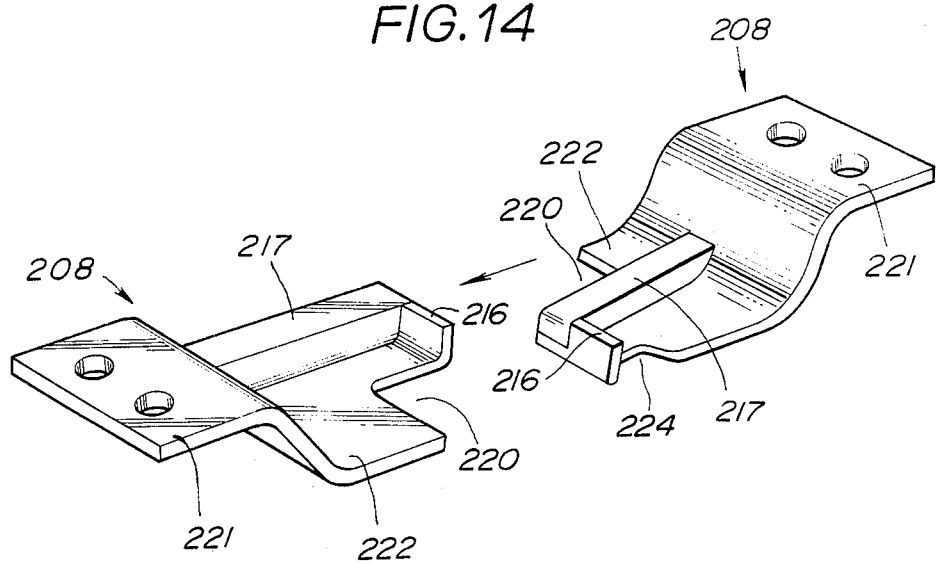
FIG. 14 is a perspective view of a pair of latch plates used in a roof structure of a fourth embodiment of the preent invention.
Figure 15A:
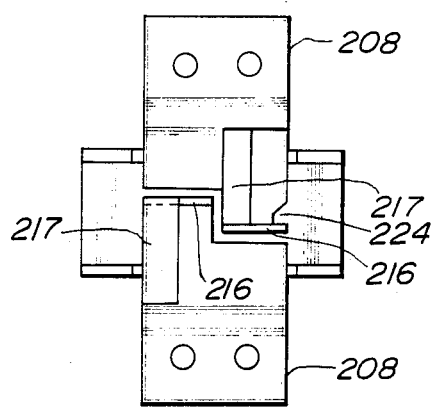
FIG. 15 is a sectional view similar to FIG. 4, but showing the fourth embodiment.
Figure 15B:
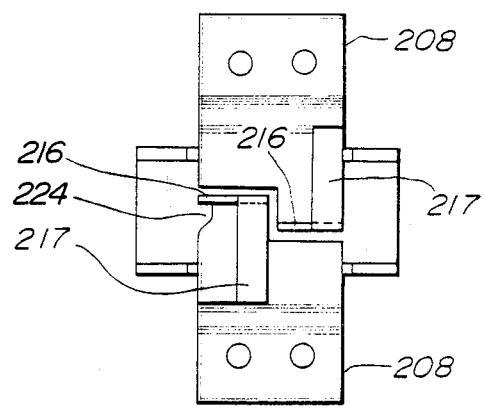
Figure 16:
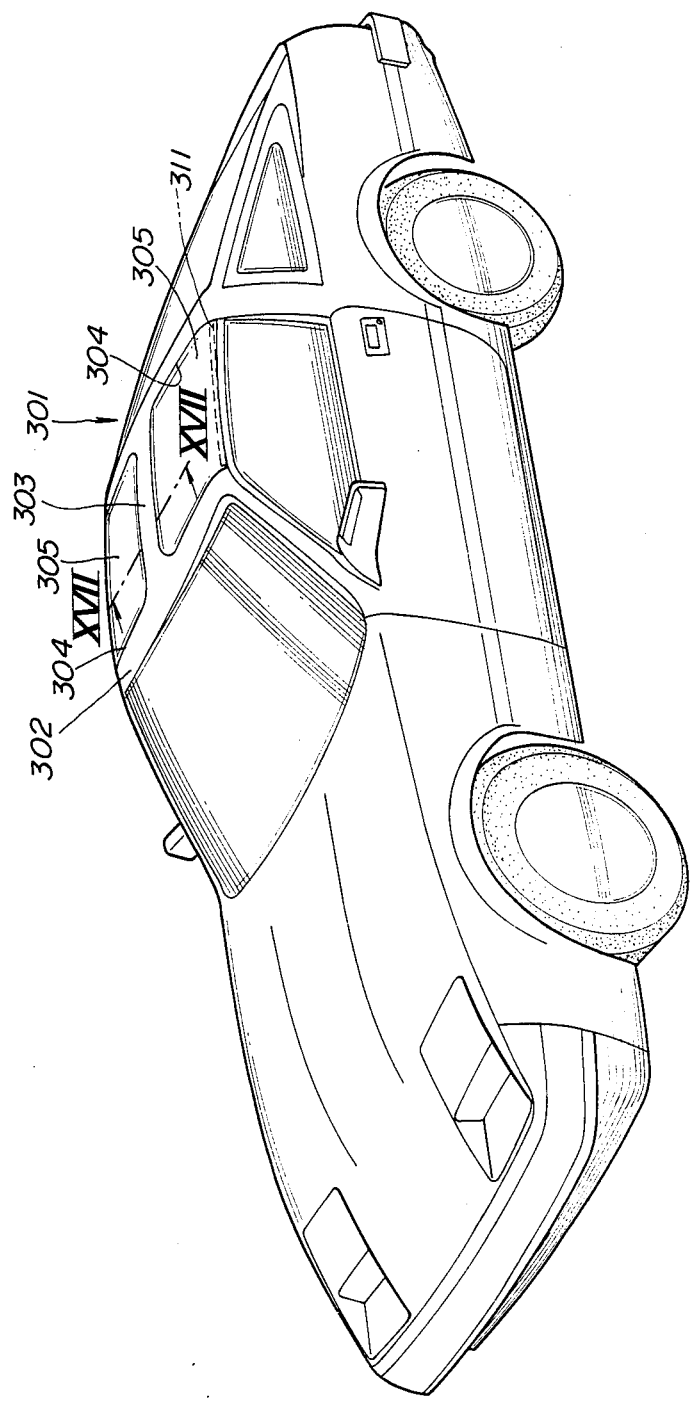
FIG. 16 is a perspective view of a vehicle for showing a roof structure of one conventional example.
Figure 17:
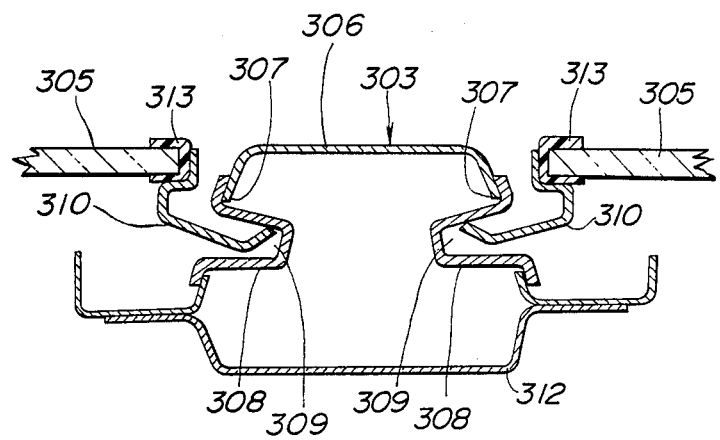
FIG. 17 is a sectional view taken on a line XVII—XVII of FIG. 16.
Figure 18:
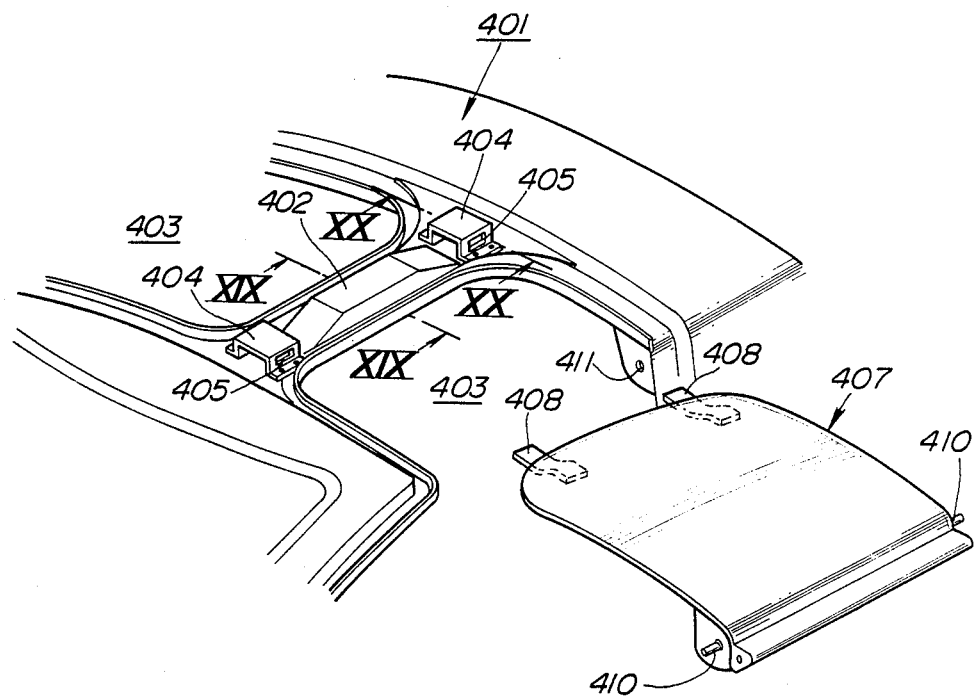
FIG. 18 is a perspective view showing a roof structure of another conventional example.
Figure 19:
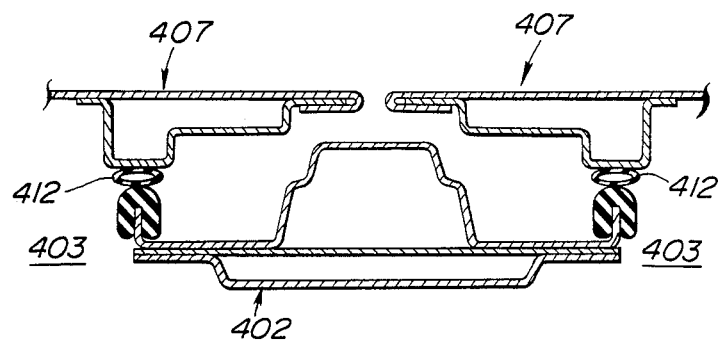
FIG. 19 is a sectional view taken on a line XIX—XIX of FIG. 18.
Figure 20:
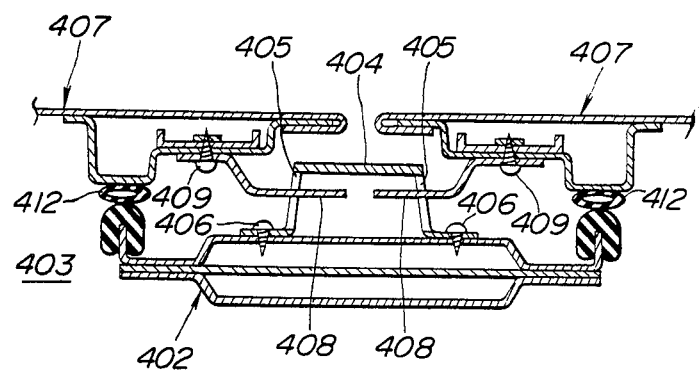
FIG. 20 is a sectional view taken on a line XX—XX of FIG. 18.

A fourth embodiment of the present invention is shown in FIGS. 14 and 15. A roof structure of the fourth embodiment has a frame structure substantially identical to those of the preceding embodiments. Like the third embodiment, each of front and rear receiving members of the fourth embodiment is formed with left and right downward flanges forming upper borders of the left and right latch holes, and fixedly mounted on the center beam. Each of the latch plates 208 of the fourth embodiment has an upward flange 216 and a guide cover 217 like the third embodiment, and further has a hollow corner 220 like the first embodiment. Each latch plate 208 has a raised portion 221 fixed to the underside of one of the lids, and a depressed portion 222 depressed between the raised portion 221 and the upward flange 216. The depressed portion 222 of each latch plate 208 is L-shaped, and the rectangular hollow corner 220 is formed by the angle of the L-shaped figure. The guide cover 217 covers only a front or rear half of the upward flange 216, and extends from the top of the upward flange 216 to the raised portion 221. In each pair of the opposite latch plates 208 to be inserted in the same receiving member, the depressed portion of one latch plate 208 has the L-shaped figure reverse to that of the other latch plate 208, like the first embodiment. When both lids are placed in the closed positions, the upward flange 216 of each latch plate 208 is deeply inserted in one receiving member to or beyond the center line of the receiving member, and received in the deep part of the hollow corner 220 of the opposite latch plate 208, as shown in FIG. 15.

In FIG. 15, the front latch plates 208 of the left and right lids received in the front receiving member are shown on the left side of FIG. 15, and the rear latch plates 208 received in the rear receiving member are shown on the right. In each of the front latch plates 208, the cover 217 is placed at such a position as to cover the front half of the upward flange 216. In each of the rear latch plates 208, the cover 217 is placed at such a position as to cover the rear half of the upward flange 216. In the front latch plate 208 whose upward flange 216 is remoter from the front end of the vehicle in the closed state than the upward flange of the opposite front latch plate 208, the cover 217 is situated in the middle between the front and rear sides of the latch plate 208 to prevent interference between the upward flanges in the front receiving member, and a notch 224 is formed in the rear side of the latch plate 208 behind the upward flange 216. In the rear latch plate 208 whose upward flange 216 is closer to the front end of the vehicle in the closed state than the upward flange of the opposite rear latch plate 208, the cover 217 is situated in the middle to prevent interference between the upward flanges 216 in the rear receiving member, and a notch 224 is formed in the front side of the latch plate behind the upward flange 216. Each notch 224 facilitates engagement between the upward and downward flanges when an excessive load is applied upwardly to the lid.

What is claimed is:

1. A roof structure of a vehicle comprising: a frame having a front portion, a rear portion, a center beam extending along a longitudinal axis of the vehicle and connecting said front and rear portions, and left and right roof openings formed between said front and rear portions and separated by said center beam, left and right removable roof lids for closing said left and right roof openings, respectively, to form a closed roof surface and concealing said center beam under the closed roof surface when said left and right lids are placed in respective left and right closed positions, and fastening means for securing said left and right lids in said left and right closed positions to said frame structure, said fastening means comprising left and right latch means fixed, respectively, to undersides of said left and right lids, and receiving means which is fixedly mounted on an upper surface of said center beam, and formed with left and right latch holes receiving said left and right latch means, respectively, when said lids are placed in said closed positions, each of said latch holes being bounded on an upper side by a downward flange, and each of said latch means being formed with an upward flange which is inserted in one of said latch holes when said lids are placed in said closed positions, wherein each of said left and right latch means comprises a first latch plate having a fixed end fixed to said underside of one of said lids and a flanged end formed with said upward flange, and wherein a guide cover is fixed to each of said latch plates in such a manner as to cover a depressed portion adjoining said upward flange and to normally prevent engagement between said upward flange and said downward flange of said receiving means.

2. A roof structure according to claim 1 wherein said receiving means comprises front and rear receiving members each having said left and right latch holes, said front and rear receiving members being fixed on said center beam apart from each other along said center beam, and wherein each of said left and right latch means further comprises a second latch plate formed with said upward flange at one end and provided with said guide cover, said first and second latch plates of each lid being positioned so that said first and second latch plates are inserted, respectively, in said front and rear receiving members.

3. A roof structure according to claim 2 wherein each of said latch plates has a raised portion fixed to said underside of one of said lids, and said depressed portion which is depressed between said raised portion and said upward flange, and partly covered by said guide cover having a substantially flat upper surface extending from a top of said upward flange to said raised portion.

4. A roof structure according to claim 3 wherein, when said lids are placed in said closed positions, each of said latch plates extends from said fixed end to said flanged end substantially along a lateral axis of the vehicle, each of said upward and downward flanges extends substantially along the longitudinal axis of the vehicle, and said upper surface of each guide cover extends substantially in parallel to both of the longitudinal and lateral axes, over said top end of said upward flange and said depressed portion.

5. A roof structure according to claim 3 wherein each of said guide covers has a width approximately equal to a half of a length of said upward flanges.

6. A roof structure according to claim 5 wherein, in each lid, one of said guide covers is so placed as to cover only a front half of said depressed portion of said first latch plate to be inserted in said front receiving member, and the other of said guide covers is so placed as to cover only a rear half of said depressed portion of said second latch plate to be inserted in said rear receiving member.

7. A roof structure according to claim 6 wherein, when said lids are in said closed positions, said upward flanges of said latch plates of said left and right lids confront each other in each of said receiving members.

8. A roof structure according to claim 3 wherein said depressed portion of each of said latch plates is L- shaped, and formed with a hollow corner formed by the angle of the L-shaped figure of said depressed portion, said latch plates being arranged so that, in each of said receiving members, said hollow corner of one of said latch plates of said left and right lids receives said flanged end of the other of said latch plates.

9. A roof structure according to claim 8 wherein each of said latch plates of said left and right lids is inserted in one of said receiving members deeply beyond a longitudinal center line of said receiving member.

10. A roof structure according to claim 3 wherein said fastening means further comprises left and right lock means mounted, respectively, on said left and right lids for securing outer ends of said left and right lids in said closed positions to said frame structure.

11. A roof structure of a vehicle comprising:
a frame structure having a front portion, a rear portion, a center beam extending along a longitudinal axis of the vehicle and connecting said front and rear portions, and left and right roof openings formed between said front and rear portions and separated by said center beam,
left and right removable roof lids for closing said left and right roof openings, respectively, to form a closed roof surface and concealing said center beam under the closed roof surface when said left and right lids are placed in respective left and right closed positions, and
fastening means for securing said left and right lids in said left and right closed positions to said frame structure, said fastening means comprising left and right latch means fixed, respectively, to undersides of said left and right lids, and receiving means which is fixedly mounted on an upper surface of said center beam, and formed with left and right latch holes receiving said left and right latch means, respectively, when said lids are placed in said closed positions, each of said left and right latch means comprises a first latch plate having a raised portion fixed to said underside of one of said lids, and a depressed portion projecting from said raised portion and terminating at a projecting end, said depressed portion of each of said latch plates being L-shaped, and formed with a hollow corner formed by an angle of the L-shaped figure of said depressed portion, said latch plates being arranged so that said hollow corner of one of said latch plates of said left and right lids receives said projecting end of the other of said latch plates when said lids are placed in said closed positions.

12. A roof structure according to claim 11 wherein said receiving means has a substantially flat top and an upright flange projecting upwardly from said top and extending along the longitudinal axis of the vehicle.

13. A roof structure according to claim 12 wherein said depressed portion of each of said latch plates is covered with a molding, and said top of said receiving means is covered with a molding which is formed with said upright flange.

* * * * *